United States Patent [19]
Veldhuis

[11] Patent Number: 4,876,595
[45] Date of Patent: Oct. 24, 1989

[54] DEVICE FOR REPRODUCING DIGITIZED VIDEO PICTURES USING AN IMPROVED RESTORATION METHOD

[75] Inventor: Raymond N. J. Veldhuis, Eindhoven, Netherlands

[73] Assignee: U.S. Philips Corporation, New York, N.Y.

[21] Appl. No.: 221,684

[22] Filed: Jul. 20, 1988

[30] Foreign Application Priority Data

Jun. 6, 1988 [NL] Netherlands ............. 8801441

[51] Int. Cl.⁴ ............................................. H04N 7/12
[52] U.S. Cl. .................................. 358/136; 358/166; 358/167
[58] Field of Search .............. 358/133, 141, 135, 136, 358/166, 167, 160

[56] References Cited

U.S. PATENT DOCUMENTS

4,792,851 12/1988 Mochizuki ................. 358/136

Primary Examiner—James J. Groody
Assistant Examiner—Victor R. Kostak
Attorney, Agent, or Firm—Michael E. Marion

[57] ABSTRACT

A device for reproducing digitally presented video pictures includes a restoration circuit for restoring erroneous picture elements. To this end a reference sub-picture is composed from the erroneous picture elements and non-erroneous picture elements, the erroneous picture elements being completely enclosed by the non-erroneous picture elements. The erroneous picture elements are subsequently replaced by zero picture elements. Each picture element is then considered as a sum of weighted versions of picture elements which form part of a prediction field. The set of prediction coefficients associated with this prediction field is obtained by minimizing a prediction coefficient function. This operation is performed for different prediction fields and the restoration process is continued in known manner, this continuation being based on the prediction field yielding the smallest value for the prediction coefficient function.

1 Claim, 6 Drawing Sheets

PRF₀

PRF₁

PRF₂

PRF$_3$ $$\begin{array}{ccc}
0 & 0 & 0 \\
s(i-2,j-2) & s(i-2,j-1) & s(i-2,j) \\
0 & 0 & 0 \\
s(i-1,j-2) & s(i-1,j-1) & s(i-1,j) \\
0 & 0 & \Delta \\
s(i,j-2) & s(i,j-1) & s(i,j) \\
0 & 0 & \\
s(i+1,j-2) & s(i+1,j-1) & \\
0 & 0 & \\
s(i+2,j-2) & s(i+2,j-1) & \\
\end{array}$$

$i = 3, 4, 5, \cdots, 8$
$j = 3, 4, 5, \cdots, 10$

FIG.6

PRF$_4$ $$\begin{array}{ccccc}
0 & 0 & 0 & 0 & 0 \\
s(i-2,j-2) & s(i-2,j-1) & s(i-2,j) & s(i-2,j+1) & s(i-2,j+2) \\
0 & 0 & 0 & 0 & 0 \\
s(i-1,j-2) & s(i-1,j-1) & s(i-1,j) & s(i-1,j+1) & s(i-1,j+2) \\
0 & 0 & \Delta & 0 & 0 \\
s(i,j-2) & s(i,j-1) & s(i,j) & s(i,j+1) & s(i,j+2) \\
0 & 0 & 0 & 0 & 0 \\
s(i+1,j-2) & s(i+1,j-1) & s(i+1,j) & s(i+1,j+1) & s(i+1,j+2) \\
0 & 0 & 0 & 0 & 0 \\
s(i+2,j-2) & s(i+2,j-1) & s(i+2,j) & s(i+2,j+1) & s(i+2,j+2) \\
\end{array}$$

$i = 3, 4, 5, \cdots, 8$
$j = 3, 4, 5, \cdots, 8$

DEVICE FOR REPRODUCING DIGITIZED VIDEO PICTURES USING AN IMPROVED RESTORATION METHOD

A. BACKGROUND OF THE INVENTION

A(1) Field of the Invention

The invention generally relates to devices for reproducing digitized video pictures and more particularly to a restoration circuit used in these devices for restoring erroneous picture elements by means of some restoration method.

Such a device may be a television receiver for receiving digital television pictures which are transmitted by a television broadcasting transmitter, but it may also be an apparatus for reproducing digitally stored pictures.

A(2) Description of the Prior Art

A video picture is generally assumed to be composed of an array of $M_1 \times M_2$ picture elements. For a video picture consisting of 625 lines $M_1 = 625$ and $M_2$ is usually 720. For the transmission of such a video picture it is subjected to a data reduction method in order to maintain the quantity of bits to be transmitted per second (bit rate) within certain limits. A data reduction method which is very frequently used is transform coding. In this method the video picture is partitioned into sub-pictures of $N \times N$ picture elements each; a typical value of N is four or eight. Each sub-picture is subsequently transformed by means of a two-dimensional transform into a number of so-called coefficients accurately describing this sub-picture. For more information relating to transform coding see, for example, pages 225-232 of Reference 1.

The physical significance of this two-dimensional transform is the following. Each sub-picture is considered to be a sum of a plurality of mutual orthogonal basic pictures each also consisting of $N \times N$ picture elements and each with its own weighting factor. It is these weighting factors, conventionally referred to as coefficients, which are obtained by means of the two-dimensional transform.

If an error occurs in one of the coefficients in the transmission channel, this has consequences for all picture elements of the relevant sub-picture. Literature describes several so-called methods of restoring erroneous signal values in general. These known restoration methods are generally also applicable to video pictures, both in one and in two dimensions. References 2 and 3 describe some of these restoration methods. Notably, the restoration method proposed in Reference 3 yields good results for video pictures.

The restoration method proposed in Reference 3 is based on the idea that a prediction picture element $s(i,j)$ can be determined for each picture element $s(i,j)$ which deviates to a slight extent from the picture element and which can be considered as a linear combination of weighted versions of picture elements located in the vicinity of this picture element. This vicinity will be referred to as prediction field and it is thus understood to mean the collection of those picture elements which are considered for predicting another picture element, hereinafter referred to as reference picture element. Thus, it holds for each prediction picture element that:

$$\hat{s}(i,j) = \sum_k \sum_l a(k,l) s(i-k, j-l) \quad (1)$$

The weighting factors $a(k,l)$ are conventionally referred to as prediction coefficients and the collection of values $k,l$ considered represents the prediction field.

This known restoration method is also based on the idea that the prediction coefficients should not be considered to be constant throughout the picture, but only within a limited partial region which will be referred to as reference sub-picture and which consists of $P_1 \times P_2$ picture elements. Such a reference sub-picture is chosen to be such that it comprises all erroneous picture elements of an erroneous sub-picture, enclosed by non-erroneous (correct) picture elements. This means that for each reference sub-picture the prediction coefficients should be computed again before the erroneous picture elements can be restored. For computing the prediction coefficients each erroneous picture element within the reference sub-picture is firstly replaced in a preset process by a predetermined auxiliary picture element, for example, by zero, so that an up-dated reference sub-picture is obtained. Subsequently an iteration prediction process is performed. This process comprises a coefficient prediction step in which, as far as is possible, the associated prediction picture element is determined in accordance with expression (1) for each picture element in the up-dated reference sub-picture. Since the prediction coefficients are not known, this means that each picture element is written as a function in $a(k,l)$ of the picture elements of the prediction field chosen. If the difference between a picture element and its prediction picture element is referred to as prediction error and is indicated by $e(i,j)$, it holds that:

$$e(i,j) = s(i,j) - \hat{s}(i,j) \quad (2)$$

In this expression the prediction error is thus also a function of the prediction coefficients $a(k,l)$. By squaring all prediction errors which can be defined for the reference sub-picture and by adding them, a prediction coefficient function $Q(a)$ is obtained which is thus defined as follows:

$$Q(a) = \sum_i \sum_j e(i,j)^2 \quad (3)$$

and which is a function of all prediction coefficients. Since the erroneous picture elements were initially set at zero, a first approximation can now be obtained of the set of prediction coefficients applying to the entire reference sub-picture by minimizing the prediction coefficient function $Q(a)$. The minimum value of this prediction coefficient function $Q(a)$ for a given prediction coefficient is obtained by differentiating this function with respect to this prediction coefficient and by setting this derivative to zero. Since this function is quadratic in these prediction coefficients, the first approximation of each prediction coefficient thus follows.

By computing a prediction picture element in accordance with expression (1) by means of these known (first approximation) prediction coefficients in a picture element prediction step, in which the picture elements to be restored are now assumed to be the unknowns, each prediction picture element becomes a function of the unknown picture elements. By determining a prediction error in accordance with expression (2) and by defining, in analogy with expression (3), a picture element function $Q(x)$ in accordance with $$Q(x) = \sum_i \sum_j e(i,j)^2 \qquad (4)$$

a first approximation of the erroneous picture elements follows in a corresponding way as described above. By replacing the original erroneous picture elements in a substitution step by these first approximations, an up-dated reference sub-picture is again produced and the coefficient prediction step and the picture element prediction step can again be performed, which leads to an even more accurate approximation of the original erroneous picture elements. This can be continued until a sufficiently accurate approximation is obtained. Usually it appears that the use of this restoration method does not lead to a noticeable improvement after the third approximation of the erroneous picture elements.

B. OBJECT AND SUMMARY OF THE INVENTION

The invention has for its object to realize an even better approximation of the erroneous picture elements.

According to the invention the preset process comprises a substitution step for replacing the erroneous picture elements in the reference sub-picture by predetermined fixed picture elements, and

- a coefficient prediction step for determining a plurality of sets of prediction coefficients, each set being associated with the picture elements of a prediction field of a plurality of different prediction fields;
- a selection step for selecting this prediction field for performing the coefficient prediction step in the iteration prediction process and the associated set of prediction coefficients for which the prediction coefficient function has the smallest value;
- a picture element prediction step for determining the auxiliary picture elements on the basis of the prediction coefficients selected in the selection step;
- a substitution step for replacing the original erroneous picture elements of the reference sub-picture by the auxiliary picture elements to compose the up-dated reference sub-picture.

The invention is based on the recognition that a video picture comprises arbitrarily varying structures, for example, a line with a 20° slope, or with a 90° or 150° slope. If, as is the case in Reference 3, always the same prediction field is taken, it may be chosen to be such that it is suitable for structures varying, for example, in accordance with a 20° slope. Errors occurring along this slope can be restored very accurately. Errors occurring in structures varying in accordance with a different slope, for example, the 90° or 150° slope, cannot be restored very accurately. According to the invention, by searching the prediction field being closest to the structure of the video picture within the reference sub-picture, an optimum restoration of erroneous picture elements can be realized.

C. REFERENCES

1. Scene Adaptive Coder; W. H. Chen, W. K. Pratt; IEEE Transactions on Communications, Vol. COM-32, No. 3, March 1984.
2. Schaltungsanordnung zur Korrektur gestörter Abtastwerte bei einer PCM Übertragungseinrichtung, insbesondere einer Digital-Tonplatte; W. Scholt; European patent application No. 0 044 963.
3. Method of correcting erroneous values of samples of an equidistantly sampled signal and device for carrying out the method; J. A. Janssen; R. N. J. Veldhuis, H. J. Prins, L. B. Vries; European patent application No. 0 146 988.

D. EXPLANATION OF THE INVENTION

D(1) Brief description of the Figures

D(2) Theoretical background

Figure 1:
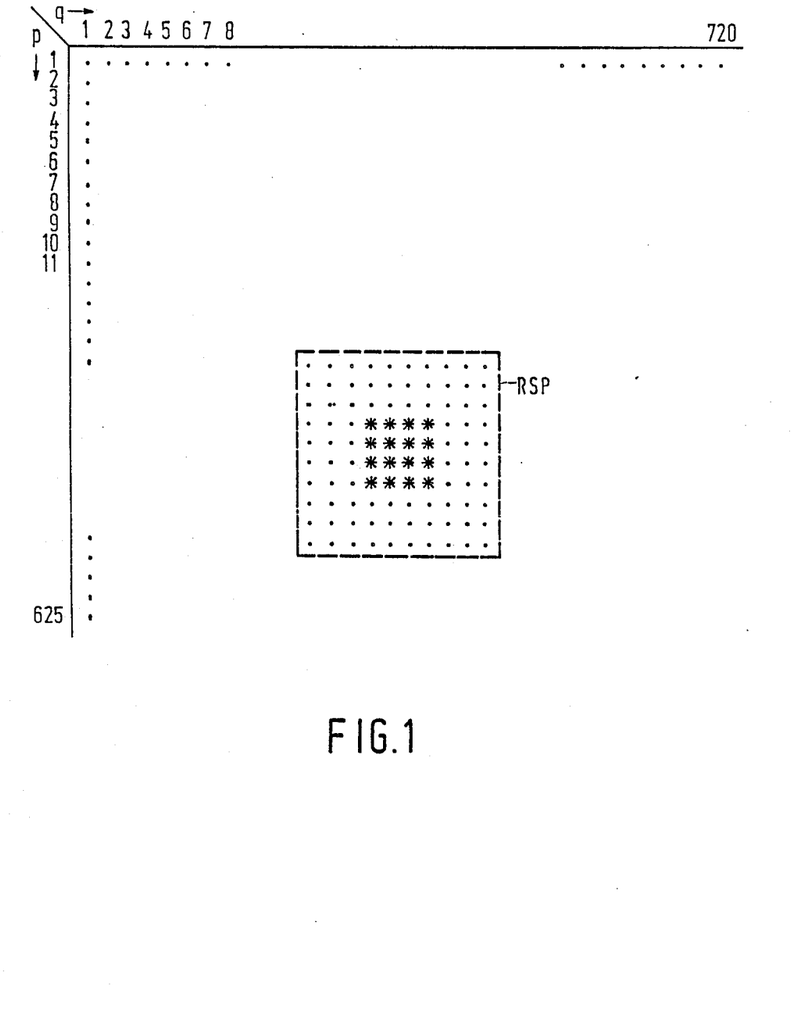
FIG. 1 shows a video picture composed of picture elements with a reference sub-picture comprising picture elements to be restored.

In FIG. 1 dots indicate the picture elements of a video picture composed of 625 lines. Each line comprises 720 picture elements. In this Figure the line numbers p are plotted vertically and the picture element numbers q of the picture elements are plotted horizontally on a line. It will be assumed that for the transmission of such a video picture this picture is subjected to a transform coding in which sub-pictures of $4 \times 4$ picture elements are used. If one of the coefficients of the picture transform cannot be reconstructed, this means that all picture elements of the associated sub-picture are erroneous. In FIG. 1 the erroneous picture elements of such an erroneous sub-picture are denoted by *. For performing the restoration process a reference sub-picture of $P_1 \times P_2$ picture elements is defined first. It comprises the erroneous picture elements of the erroneous sub-picture, as well as non-erroneous (correct) sub-pictures, the erroneous sub-picture being enclosed by the correct sub-pictures. In the video picture shown in FIG. 1 such a reference sub-picture is denoted by RSP. It is to be noted that for the sake of simplicity of the Figure a reference sub-picture of $10 \times 10$ picture elements has been chosen. FIG. 2 again shows this reference sub-picture RSP on a larger scale. Each picture element of this reference sub-picture is identified by its coordinates i and j. A picture element will hereinafter be referred to as $s(i,j)$.

Figure 3:
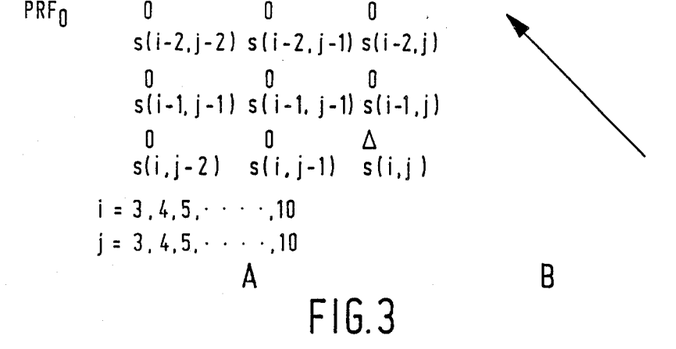
FIGS. 3, 4, 5, 6, 7 show different forms of prediction fields.

For performing the restoration process a prediction picture element $\hat{s}(i,j)$ is determined, as far as is possible, for each picture element $s(i,j)$ of the reference sub-picture. If the picture element for which a prediction picture element must be determined is referred to as reference picture element, its prediction picture element is equal to the sum of weighted versions of predetermined picture element located in its vicinity. The latter picture elements constitute the prediction field for the reference picture element. FIG. 3 further illustrates this for the purpose of clarification. In this Figure the symbol $\Delta$ denotes the reference picture element $s(i,j)$ and the symbol o denotes the picture elements of a conventional prediction field. For the prediction picture element it holds in conformity with (1) that $$\hat{s}(i,j) = \sum_{k=0}^{2} \sum_{l=0}^{2} a(k,l)s(i-k,j-l) \qquad (5)$$

with i,j = 3, 4, 5, ..., 10.

It will now initially be assumed that all picture elements of the reference sub-picture RSP are known. To achieve this, this reference sub-picture is firstly converted by way of a preset process into an up-dated reference sub-picture $RSP_0$ which differs from the original reference sub-picture RSP in that all erroneous picture elements are set to a predetermined value, for example, the value of zero. In order to determine the still unknown prediction coefficients $a(k,l)$ which are different for each reference sub-picture, an iteration prediction process is performed which comprises a plurality of steps. The first step is a coefficient prediction step. In this step the difference between each prediction picture element defined in accordance with (5) and the associated reference picture element in the up-dated reference sub-picture $RSP_0$ is taken. This difference is the prediction error $e(i,j)$ in accordance with expression (2) and is a function of the still unknown prediction coefficients. Those coefficients which yield the smallest quadratic error for the entire reference sub-picture are now chosen as prediction coefficients. To this end the prediction coefficient function $Q(a)$ is defined as follows in accordance with expression (3):

$$Q(a) = \sum_{i=3}^{10} \sum_{j=3}^{10} e(i,j)^2 \quad (6)$$

and this function of the prediction coefficients is minimized so that a set of eight prediction coefficients is obtained in this case.

Since the erroneous picture elements had been given a predetermined initial value which was also erroneous, a second step is performed in this iteration prediction process, the so-called picture element prediction step. In this step a prediction picture element in accordance with expression (5) is determined again for each picture element, using the prediction coefficients $a(k,l)$ computed in the coefficient prediction step and thus being known, on the understanding that the erroneous picture elements now occur as unknowns. Subsequently the prediction errors $e(i,j)$ are again computed and all prediction errors are squared and added together. In accordance with expression (4) this yields the picture element function $Q(x)$ defined by:

$$Q(x) = \sum_{i=3}^{10} \sum_{j=3}^{10} e(i,j)^2 \quad (7)$$

and which is now a function of the unknown (erroneous) picture elements. Minimization of this function yields a set of sixteen picture elements in this case. By replacing the erroneous picture elements in the reference sub-picture RSP by the picture elements thus computed, an up-dated reference sub-picture $RSP_1$ is obtained. The accuracy of the picture elements thus obtained can be increased by performing the coefficient prediction step and the picture element prediction step once again, starting from this up-dated reference sub-picture $RSP_1$. This will lead to an up-dated reference sub-picture $RSP_2$ which in its turn can be subjected successively to a coefficient and picture element prediction step, and so forth. It is to be noted that a visibly better restoration of the erroneous picture elements is generally no longer obtained in practice after the coefficient and picture element prediction steps have been performed three times. However, in practice there is a need for further and more accurate restoration.

Figure 4:
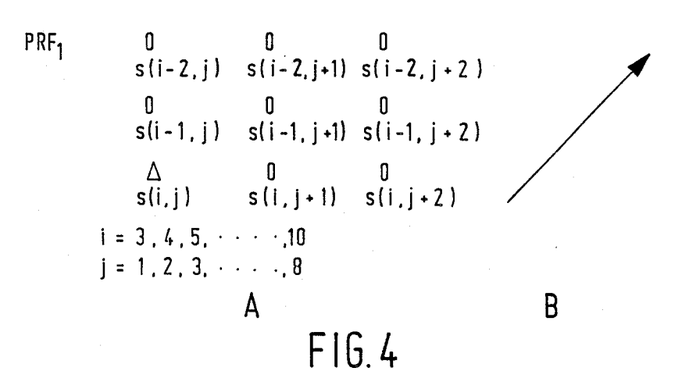
Figure 5:
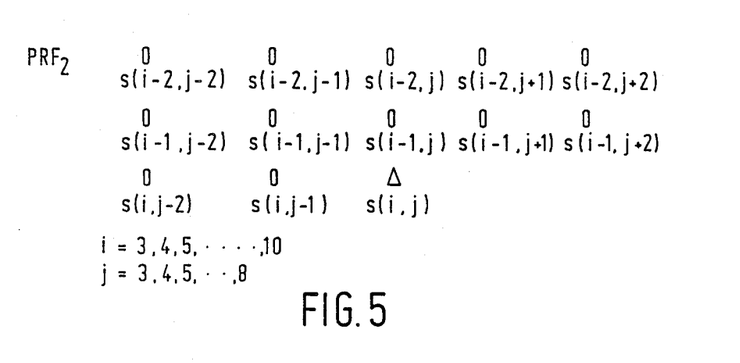
Figure 6:
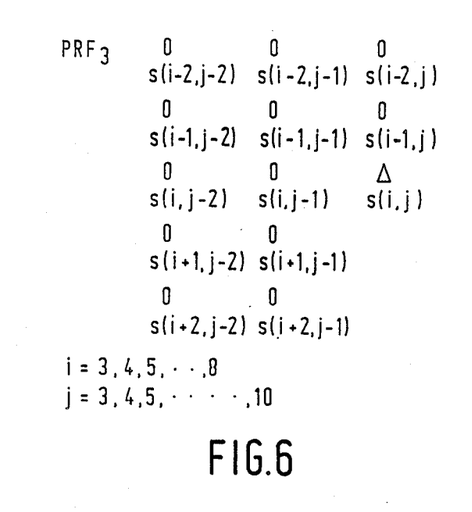
Figure 7:
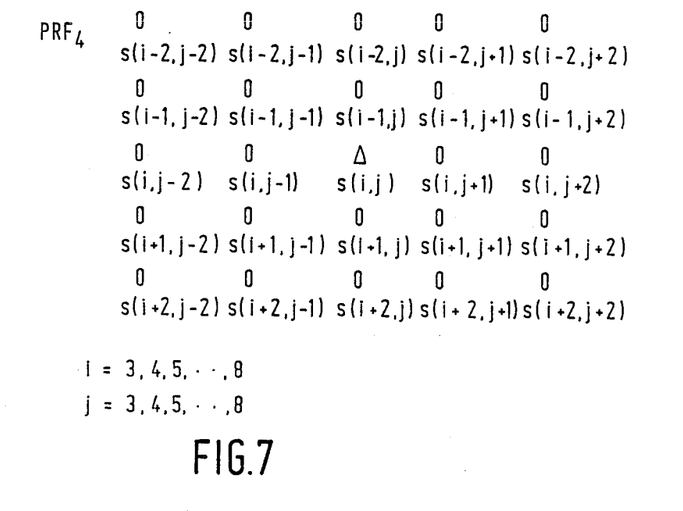

Research has proved that, for example, the prediction field shown in FIG. 3 and hereinafter denoted by $PRF_0$ is only suitable if there is a structure within the reference sub-picture (for example, a variation of brightness, or a branch of a tree) which substantially has the direction shown at B in FIG. 3. An accurate restoration of errors occurring in an area in which a structure is present which substantially has a direction as denoted by the arrow at B in FIG. 4 is only achieved with the prediction field indicated at A in FIG. 4 and denoted by $PRF_1$. Other examples of possible prediction fields are shown in FIGS. 5, 6 and 7. These fields will be denoted by $PRF_2$, $PRF_3$ and $PRF_4$, respectively.

To obtain an optimum restoration of the erroneous picture elements it is checked according to the invention which one of the different prediction fields may yield the best result. To this end the adapted reference sub-picture $RSP_0$ is subjected several times to the coefficient prediction step, each time using a different prediction field. When using the prediction field $PRF_m$ (m=0, 1, . . . ) a set of prediction coefficients $a_{PRFm}(k,l)$ is obtained. Starting from the adapted reference sub-picture $RSP_0$ the value of the prediction coefficient function defined in (3) is determined for each of these sets of prediction coefficients. For the set of prediction coefficients $a_{PRFm}(k,l)$ this means that this function has the value $Q(a_{PRFm})$. The prediction field which is most favourable for the reference sub-picture is considered to be the field yielding the smallest value for $Q(a_{PRFm})$ and this prediction field is selected for performing the iteration prediction process. The up-dated reference sub-picture $RSP_1$ required for performing this iteration prediction process is now obtained by subjecting the set of prediction coefficients computed for the selected prediction field to the picture element prediction step and by substituting the picture elements thus obtained for the erroneous picture elements in the original reference sub-picture RSP.

D(3) The reproduction device

Figure 8:
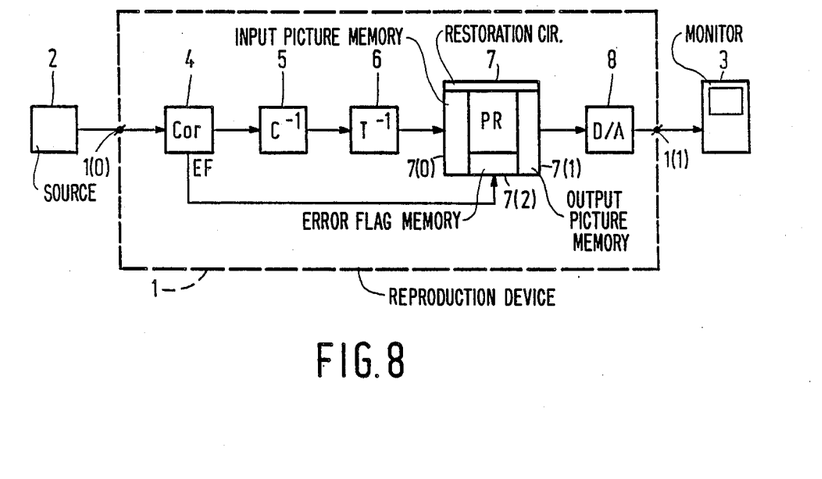
FIG. 8 shows the general structure of the reproduction device according to the invention.

FIG. 8 shows diagrammatically the structure of a reproduction device denoted by 1 in this Figure. An input 1(0) of this device receives a digitized video signal from a source 2 (for example, a magnetic tape) and its output 1(1) supplies an analog video signal which is suitable for display on a monitor 3. It will be assumed that the digital signal supplied by the source 2 is obtained by using a transform coding of the original video picture. As already noted, a video picture is split up into sub-pictures of N×N picture elements in transform coding and each sub-picture is subjected to a two-dimensional transform so that a block of N×N coefficients is obtained. The value of four is used hereinbefore for N. These coefficients are subsequently recoded. As a result, small coefficients usually becme zero. Only the coefficients which are different from zero are further subjected to an error correcting algorithm so that each non-zero coefficient is converted into an error correcting code. It is these eror correcting codes of the non-zero coefficients which are supplied by the source 2 together with information indicating which codes are associated with one and the same block and thus jointly define a sub-picture.

In the reproduction device 1 the error correcting codes of a block of coefficients are converted in a correction device 4 into the original non-zero coefficients. These are in their turn decoded in a decoding circuit 5 which thus yields the original block of zero and non-zero coefficients. This block of coefficients is transformed in a two-dimensional inverse transform device 6 to a sub-picture which largely corresponds to the original sub-picture from which the received coefficients have been derived. This sub-picture, together with the other sub-pictures constituting the picture, is stored in an input picture memory 7(0) of a restoration circuit 7. This restoration circuit 7 also has an output picture memory 7(1) whose contents are read picture element after picture element and line after line. These picture elements are converted in a digital-to-analog converter 8 into an analog video signal which can be displayed on monitor 3.

In addition to the original non-zero coefficients the correction device 4 supplies an error flag EF. It has the logic value "0" if all error correcting codes of a block can be converted into the original coefficients. If this is not the case for one or more of these error correcting codes of a block, EF will become 1. This means that the relevant error correcting codes comprise more erroneous bits than can be corrected. The error flat EF occurring for each block of coefficients is directly applied to the restoration circuit 7 and stored in a flag memory 7(2) at a memory location which corresponds to the location of the relevant sub-picture in the complete picture.

Figure 2:
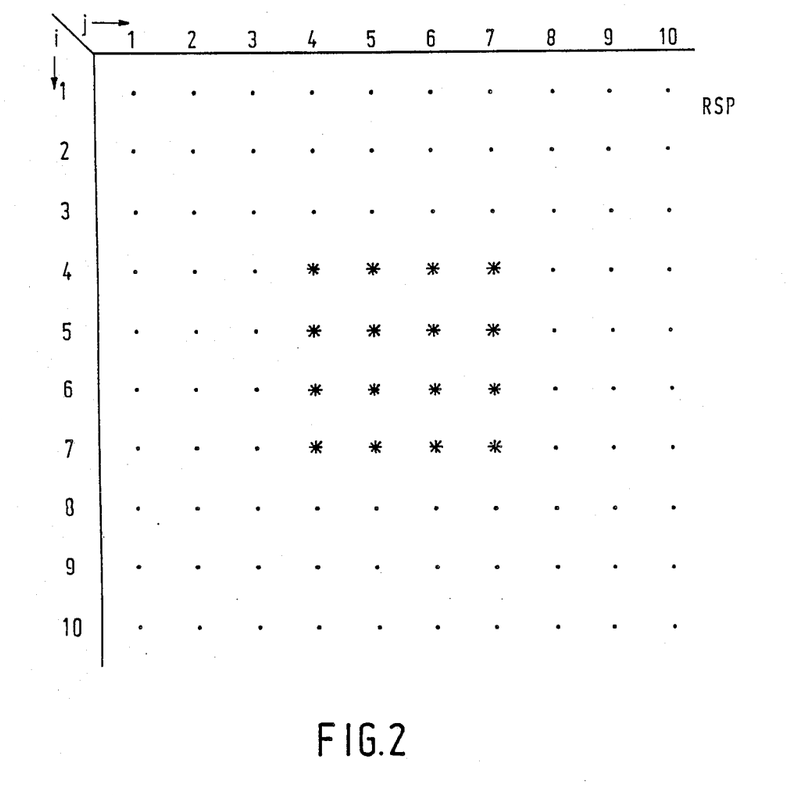
FIG. 2 shows the reference sub-picture on a larger scale.
Figure 9:
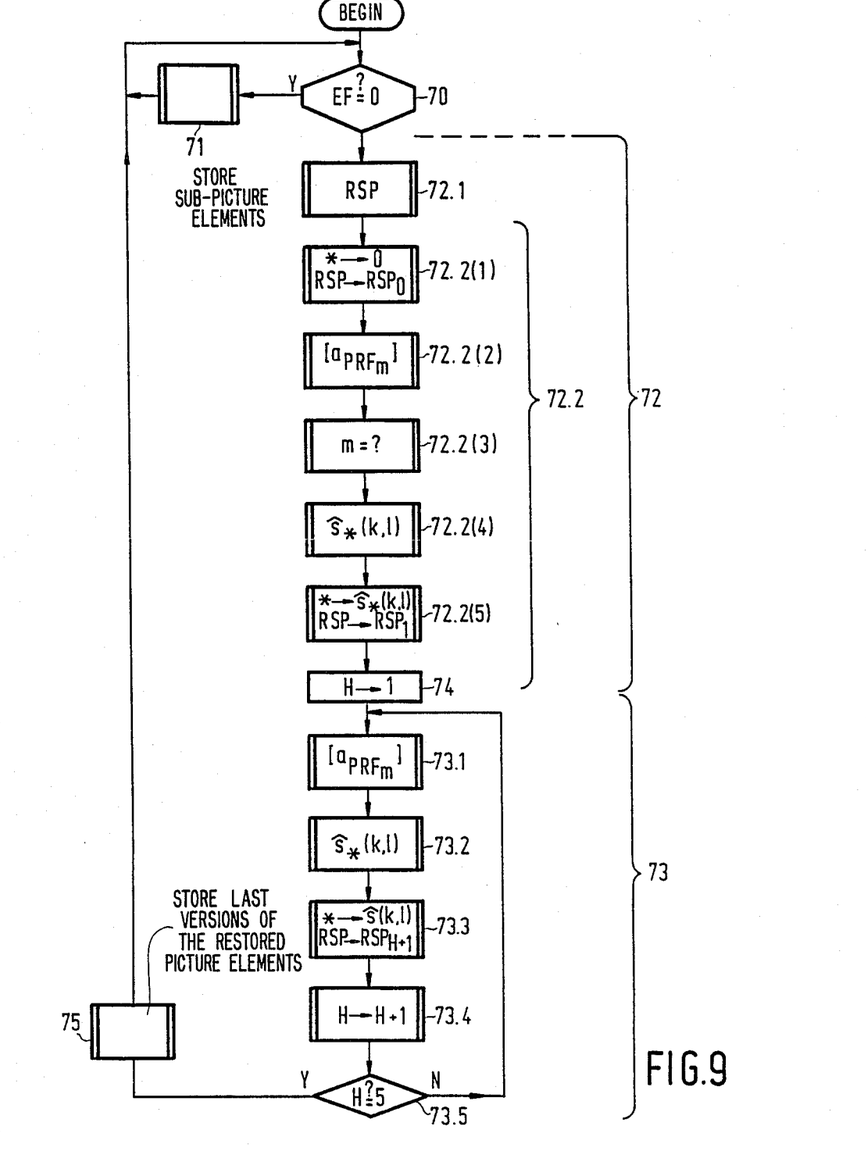
FIG. 9 shows a flow chart illustrating the operation of the restoration circuit shown in FIG. 8.

The restoration circuit 7 not only comprises the input picture memory 7(0), the output picture memory 7(1) and the error flag memory 7(2), but also a processor PR which may have the form of a microcomputer. This processor writes the picture elements of a sub-picture of the input picture memory 7(0) in an unchanged form in adequate memory locations of the output picture memory 7(1) if EF=0 holds for that sub-picture. This method is shown by means of the steps 70 and 71 in the flow chart of FIG. 9. More particularly, it is checked in step 70 whether EF=0 for a sub-picture to be transferred. If this is the case, the picture elements of this sub-picture are stored, in step 71, one by one and unchanged in adequate memory locations of the output picture memory 7(1). However, if it appears that EF=1, the relevant sub-picture consists of erroneous picture elements which must be restored. To this end a restoration process 72 is performed. It comprises a reference sub-picture defining step 72.1 in which the erroneous picture elements and the correct picture elements together constituting a reference sub-picture RSP are transferred from the input picture memory 7(0) to a working memory of the processor PR. This working memory then comprises, for example, the reference sub-picture RSP shown in FIG. 2. Subsequently a preset step 72.2 is performed which comprises a plurality of preset sub-steps. In a first preset sub-step 72.2(1) the erroneous picture elements denoted by * in FIG. 2 are replaced by zero picture elements. This yields the adapted reference sub-picture $RSP_0$. For this purpose a set of prediction coefficients $[a_{PRF_m}]$ is subsequently determined in a coefficient prediction step 72.2(2) for each of a number of different prediction fields $PRF_0$, $PRF_1$, .... In a selection step 72.2(3) it is subsequently determined which prediction field (i.e. which value of m) results in the smallest value of the prediction coefficient function $Q(a_{PRF_m})$ and this prediction field is used when proceeding with the restoration process. Starting from the prediction coefficients associated with the selected prediction field, the associated picture elements are firstly computed in the picture element prediction step 72.2(4) by means of expression (7). These elements are denoted in the Figure by $ŝ*(k,l)$ and are used as auxiliary picture elements. The last preset sub-step 72.2(5) is a substitution step. In this step the original erroneous picture elements of RSP denoted by * are replaced by the auxiliary picture elements $ŝ*(k,l)$. Consequently, a newly up-dated reference sub-picture $RSP_1$ is obtained which serves as a starting point for an iteration prediction process 73. Before performing this process, a count H is given the value 1 in a step 74. This iteration prediction process comprises the coefficient prediction step 73.1 in which, starting from $RSP_1$, the prediction coefficient function $Q(a_{PRF_m})$ is minimized to determine a new set of prediction coefficients a(k,l). These coefficients are subsequently used in the picture element prediction step 73.2 to determine a new set of restored picture elements by minimizing the picture element function Q(x). In a substitution step 73.3 the original erroneous picture elements of RSP denoted by * are again replaced by the new, restored picture elements. Consequently, an up-dated reference sub-picture $RSP_2$ is obtained again, which may serve again as a starting point for the iteration prediction step. Whether this actually happens will depend on the value of the count H after it has been run through a step 73.4 in which this quantity is raised by one. If it is found in a comparison step 73.5 that the new value of this count H has not yet reached a given value (five in this case), coefficient prediction step 73.1, picture element prediction step 73.2 and so forth are performed once again. If the count H has reached this predetermined value, the last versions of the restored picture elements are stored in adequate memory locations of the output picture memory 7(1) of the restoration circuit in a step 75. Subsequently it is checked which error flag EF is associated with a subsequent sub-picture in input picture memory 7(0), and so forth.

What is claimed is:

1. A device for reproducing digitally received video pictures comprising an array of picture elements, said device including a restoration circuit for restoring erroneous picture elements located within a reference sub-picture within which said erroneous picture elements are enclosed by non-erroneous picture elements, said restoration process comprising:
    a preset process; and
    an iteration prediction process;
characterized in that the preset process comprises:
    a substitution step for replacing the erroneous picture elements by predetermined fixed picture elements;
    a coefficient prediction step for determining a plurality of sets of prediction coefficients, each set being associated with the picture elements of a prediction field of a plurality of different prediction fields;
    a selection step for selecting said prediction field for performing the coefficient prediction step in the iteration prediction process and the associated set of prediction coefficients for which the prediction coefficient function has the smallest value;
    a picture element prediction step for determining the auxiliary picture elements on the basis of the prediction coefficients selected in the selection step; and
    a substitution step for replacing the original erroneous picture elements of the reference sub-picture by the auxiliary picture elements to compose the up-dated reference sub-picture.

* * * * *